United States Patent [19]
Dent

[11] Patent Number: 6,167,553
[45] Date of Patent: Dec. 26, 2000

[54] SPIRAL SCRAMBLING

[75] Inventor: Paul W. Dent, Pittsboro, N.C.

[73] Assignee: Ericsson Inc., Research Triangle Park, N.C.

[21] Appl. No.: 09/135,613

[22] Filed: Aug. 18, 1998

Related U.S. Application Data

[62] Division of application No. 08/682,330, Jul. 17, 1996.
[51] Int. Cl.[7] .................................................... G06F 7/02
[52] U.S. Cl. ......................... 714/819; 714/718; 714/752
[58] Field of Search .................................. 714/819, 718, 714/752

[56] References Cited

U.S. PATENT DOCUMENTS

| | | |
|---|---|---|
| 4,839,841 | 6/1989 | Hagen et al. . |
| 5,533,039 | 7/1996 | Boyer . |

FOREIGN PATENT DOCUMENTS

| | | |
|---|---|---|
| 0 202 989 | 11/1986 | European Pat. Off. . |
| 0 301 383 | 2/1989 | European Pat. Off. . |
| 23 10 654 | 1/1996 | Germany . |
| 1 605 355 | 5/1993 | United Kingdom . |

*Primary Examiner*—Phung M. Chung
*Attorney, Agent, or Firm*—Robert A. Samra

[57] ABSTRACT

A system and a method for transforming an N-bit input value into a transformed N-bit output value which may be used for error correction coding or ciphering of the N-bit input value. In a representative embodiment, the system comprises means for providing a set of all possible N-bit values as a plurality of mutually exclusive subsets each containing at least one possible N-bit value; means for comparing the N-bit input value with each of the subsets to determine to which one of the subsets the N-bit input value belongs; and means for selecting as the transformed N-bit output value an N-bit value from another one of the subsets. In accordance with the present invention, each of these subsets may be cyclically generated in a linear feedback shift register (LFSR) or, alternatively, stored in a memory.

3 Claims, 2 Drawing Sheets

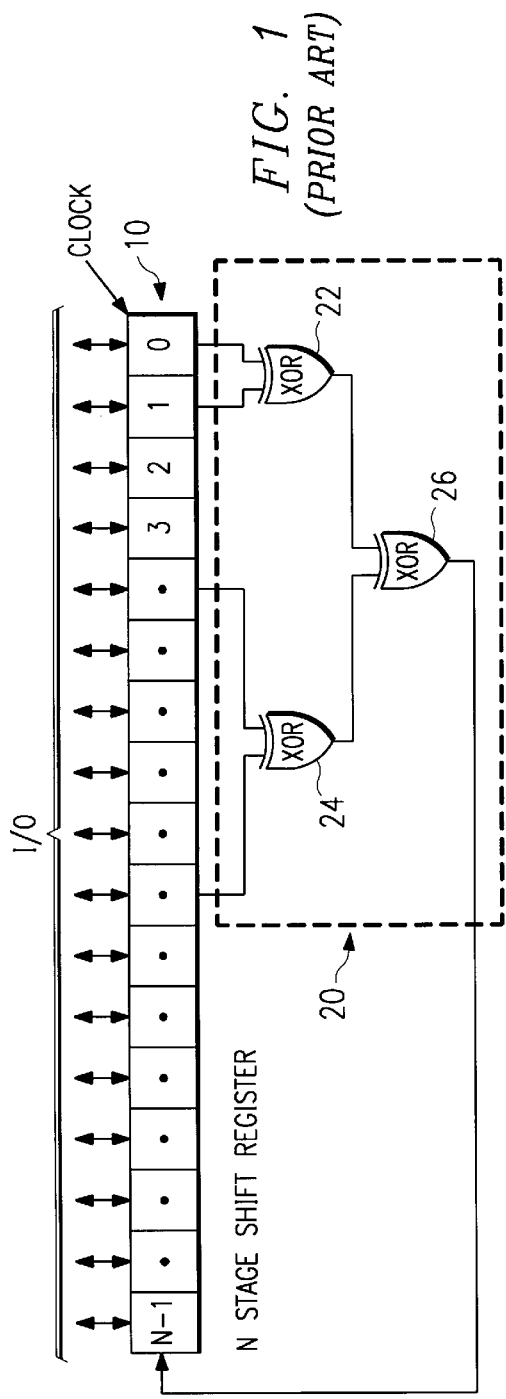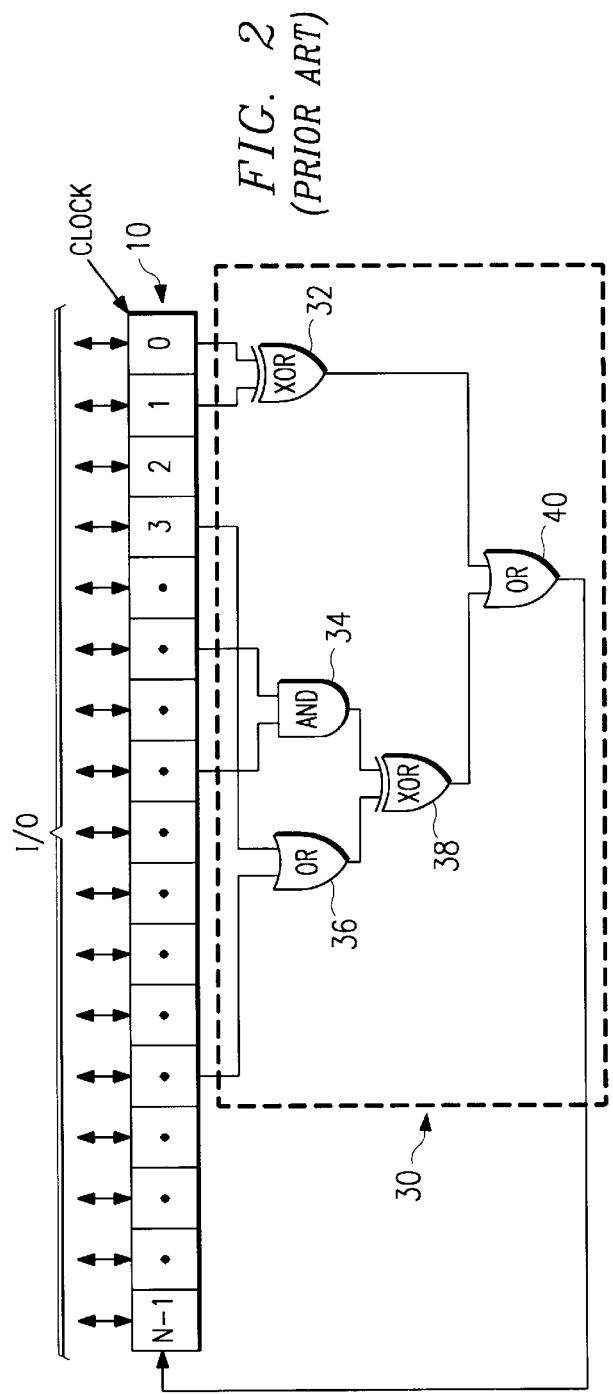

SPIRAL SCRAMBLING

This application is a division of U.S. patent application Ser. No. 08/682,330, filed on Jul. 17, 1996, now allowed with a U.S. Pat. No. 5,844,925.

BACKGROUND OF THE INVENTION

1. Field of the Invention

The present invention relates to error correction coding and/or cipher systems used in the transmission of digital data. More specifically, the present invention relates to transforming input values to output values using non-linear, 1:1 mapping.

2. Related Prior Art Systems

Both error correction coding and ciphering systems usually include a digital logic circuit for transforming digital information bitstreams or data blocks, prior to transmission, into coded or ciphered blocks, respectively, in which each transformed bit depends on several of the original information bits. When used for error correction coding, such a circuit ensures that the original information bits can be effectively recovered even if transmission errors corrupt one or more of the transformed bits, since each of the original information bits is represented by a number of transformed bits. When used for ciphering, such a circuit protects the transmitted data (i.e., the original information bits if no error coding is used, or the transformed bits if error coding is used) from unintended reception by "masking" or disguising the data. This is typically performed by bitwise Exclusive ORing the information bits or the transformed bits with masking bits possessed only by the transmitter and the intended receiver. These masking bits are usually generated from a predetermined number of bits, commonly known as the "key" bits, which are applied to a pseudo-random process that sequentially produces various combinations of the key bits for use as masking bits.

It can thus be seen that both coding and ciphering require a mechanism to produce a multi-bit output in which each of the bits is a function of a multi-bit input. To obtain this "scrambling" of input bits, the prior art has used linear feedback shift registers, non-linear feedback shift registers and look-up tables including so-called "one-time pads". FIG. 1 illustrates a prior art linear feedback shift register, while FIG. 2 illustrates a non-linear feedback shift register. In FIG. 1, the linear feedback shift register comprises an N-stage shift register 10 the contents of which may be shifted one place to the right by applying a clock pulse to each the N stages. As well known in the art, each the N stages in the shift register 10 may be implemented with a D-type flip-flop having a clock input, a one-bit data input and a one-bit data output. For convenience and simplicity, the individual clock input to, and the separate one-bit input/output (I/O) of, each of these flip-flops are shown generally by arrows in FIG. 1.

As can be seen from FIG. 1, the input to the leftmost (N−1) flip-flop receives the output of a combinatorial logic circuit 20 (shown by dashed box) comprising Exclusive OR (XOR) gates 22, 24 and 26, which combine the outputs of selected flip-flops in the shift register 10. The current output of the XOR gate 26 becomes the next input to the N−1 flip-flop after the application of each new clock pulse. It will be appreciated that since the combinatorial logic circuit 20 is comprised strictly of the XOR gates 22, 24 and 26, each of which performs a linear modulo-2 addition, the output bit from the XOR gate 26, which is fed back to the input of the leftmost stage in the shift register 10 of FIG. 1, is a linear combination of certain selected contents of the shift register 10. In FIG. 2, however, the feedback input bit to the shift register 10 is formed by a combinatorial logic circuit 30 (within dashed box) which includes not only linear combinatorial logic consisting of XOR gates 32 and 38, but also non-linear combinatorial logic consisting of an AND gate 34 and OR gates 36 and 40. Thus, the output of the OR gate 40, which is fed back to the input of the leftmost stage in the shift register 10 of FIG. 2, is a non-linear combination of certain contents of the shift register 10.

Both the linear feedback shift register of FIG. 1 and the non-linear feedback shift register of FIG. 2 may be used to form desired logical functions of a number of input bits by first loading the input bits into the shift register 10 through the I/O ports, then shifting the register contents a defined number of times by applying a corresponding number of clock pulses to the clock ports, and finally extracting the scrambled contents from the I/O ports. Each bit of the extracted output would then represent one of the desired logical functions of the original input bits. Each of the linear and non-linear feedback shift registers, however, has its own advantages and disadvantages, as described below.

An advantage of the linear feedback shift register is the ability to accurately predict the maximum number of clock pulses that can be applied before the extracted output bit pattern begins to repeat, which is not always possible for the non-linear feedback shift register. As well known in the art, the maximum cycle length for an N-stage (N-bit) linear feedback shift register is $2^{N-1}$. This means that, for a particular starting state (N-bit value), the shift register 10 will cycle through $2^{N-1}$ states (different N-bit values) before returning to its initial state. In general, the actual cycle length for a linear feedback shift register is a function of both the number of input bits and the location of the output bits (taps) used to generate the feedback bit, and is usually somewhat less than the maximum cycle length. Non-linear feedback shift registers, on the other hand, sometimes exhibit significantly shorter cycle lengths called "short cycles," which are undesirable as they undermine the effectiveness of masking, for example. Such short cycles can be avoided, however, by using a linear feedback shift register as shown in FIG. 1, for example, and carefully choosing the taps which are used to form the feedback bit (with the caveat that an all-zeros input value be avoided since that would result in a short cycle of length 1, as the output value will be all zeroes regardless of the number of clock pulses applied).

Another advantage of linear feedback shift registers is that they perform what is known as a "1:1 mapping" or "information-lossless" transformation. The term "1:1 mapping" means that, for each possible pattern of input bits, there is a unique corresponding pattern of output bits. It is thus theoretically possible to reverse the transformation and determine what pattern of input bits caused a particular output pattern. The term "information lossless" also applies because the original input information can be totally recovered. The mapping performed by non-linear feedback shift registers, however, is not necessarily 1:1, but often MANY:1. This means that several different input bit patterns may transform to the same output pattern. Such a mapping process is not unambiguously reversible and, hence, a knowledge of the output state does not guarantee that the original input state can be deduced. In other words, such a process may be "information lossy."

A disadvantage of linear feedback shift registers, on the other hand, is the relative ease with which information ciphered using such registers can be recovered by an unintended receiver. Given a particular sequence of output bits detected at the receiver, it is possible to determine the internal configuration (i.e., which taps were used to form the feedback bit) for the register which generated this output and, thus, to reconstruct both the register and the original input information. Such reconstruction is more difficult in the case of a non-linear feedback shift register, and may require an uneconomic amount of computation. The enhanced security advantage associated with using non-linear feedback shift registers for ciphering derives from the same properties of these registers which, in the other contexts described above, were deemed to be a disadvantage (e.g., the MANY:1 mapping). Conversely, the reduced security disadvantage of linear feedback shift registers in the ciphering context derives from the same properties of those registers which, in the other contexts described above, were deemed to be an advantage (e.g., the 1:1 mapping). Clearly, it would be desirable to combine the advantages of both linear and non-linear feedback shift registers while avoiding their attendant disadvantages.

One approach to providing a non-linear mapping of input to output, which is yet guaranteed to be 1:1, is to use a so-called substitution box (S-box) or look-up table. When the number of input bits N is small (e.g., 4–16), a table of unique outputs corresponding to the $2^N$ possible inputs may be stored in a memory. Thus, for 4-bit inputs, the memory would store 16 output patterns, while for 16-bit inputs, the memory would have to store 65,536 output patterns. Memory size and cost, of course, set a practical limit to the use of S-boxes. In principle, the contents of an S-box may be chosen completely at random, as long as no output pattern is used more than once, in order to preserve the desirable 1:1 relationship.

An early implementation of S-boxes was seen in manual ciphering systems in which books of input patterns and corresponding output patterns, known as "one-time pads," were provided to a transmitting correspondent and a receiving correspondent. After using a page of patterns in the book for ciphering or deciphering a message, the page was to be torn out and destroyed. Human error, however, often resulted in the incorrect use of one-time pads and in an abrogation of the intended security. For modern applications, such as protecting against the unauthorized reception of cellular radiotelephone calls, automatic electronic systems are needed. Such a system is provided by the present invention.

SUMMARY OF THE INVENTION

The present invention provides a system and a method for transforming an N-bit input value into a transformed N-bit output value which may be used for error correction coding or ciphering of the N-bit input value.

In one aspect, the system of the present invention comprises a plurality of linear feedback shift registers (LFSRs) each cyclically generating at its output a subset of all possible N-bit values which is not generated by any other of the LFSRs, the LFSRs together cyclically generating a set of all possible N-bit values. The system further comprises means for comparing each of the N-bit output values that are cyclically generated by the LFSRs to the N-bit input value to determine which of the N-bit output values matches the N-bit input value; and means for selecting as the transformed N-bit output value the output of one of the LFRSs other than the LFSR whose N-bit output value is determined to match the N-bit input value. In one embodiment of this system, at least some of the LFSRs are arranged in a circular group such that when the N-bit output value of one of the LFSRs in the group is determined to match the N-bit input value, the output of the next LFSR in the circular group is selected as the transformed N-bit output value.

In another aspect, the system of the present invention comprises means for providing a set of all possible N-bit values as a plurality of mutually exclusive subsets each containing at least one possible N-bit value; means for comparing the N-bit input value with each of the subsets to determine to which one of the subsets the N-bit input value belongs; and means for selecting as the transformed N-bit output value an N-bit value from another one of the subsets. In one embodiment of this system, each of the subsets is cyclically generated in a linear feedback shift register (LFSR). In another embodiment of this system, each of the subsets is stored in a memory. In either embodiment, at least some of the subsets may be arranged in a circular group such that when the N-bit input value is determined to belong to one of the subsets in the circular group, an output value from the next subset in the circular group is selected as the transformed N-bit output value.

In yet another aspect, the method of the present invention comprises the steps of providing a set of all possible N-bit values as a plurality of mutually exclusive subsets each containing at least one possible N-bit value; comparing the N-bit input value with each of the subsets to determine to which one of the subsets the N-bit input value belongs; and selecting as the transformed N-bit output value an N-bit value from another one of the subsets. In one embodiment of this method, each of the subsets is cyclically generated in a linear feedback shift register (LFSR). In another embodiment of this method, each of the subsets is stored in a memory. In either embodiment, at least some of the subsets may be arranged in a circular group such that when the N-bit input value is determined to belong to one of the subsets in the circular group, an output value from the next subset in the circular group is selected as the transformed N-bit output value.

BRIEF DESCRIPTION OF THE DRAWINGS

The present invention will be better understood and its numerous objects and advantages will become apparent to those skilled in the art by reference to the following drawings in which:

FIG. 1 is a block diagram of a prior art linear feedback shift register which may be used for transforming an N-bit input into a transformed N-bit output;

FIG. 2 is a block diagram of a prior art non-linear feedback shift register which may also be used for transforming an N-bit input into a transformed N-bit output.

DETAILED DESCRIPTION

Figure 3:
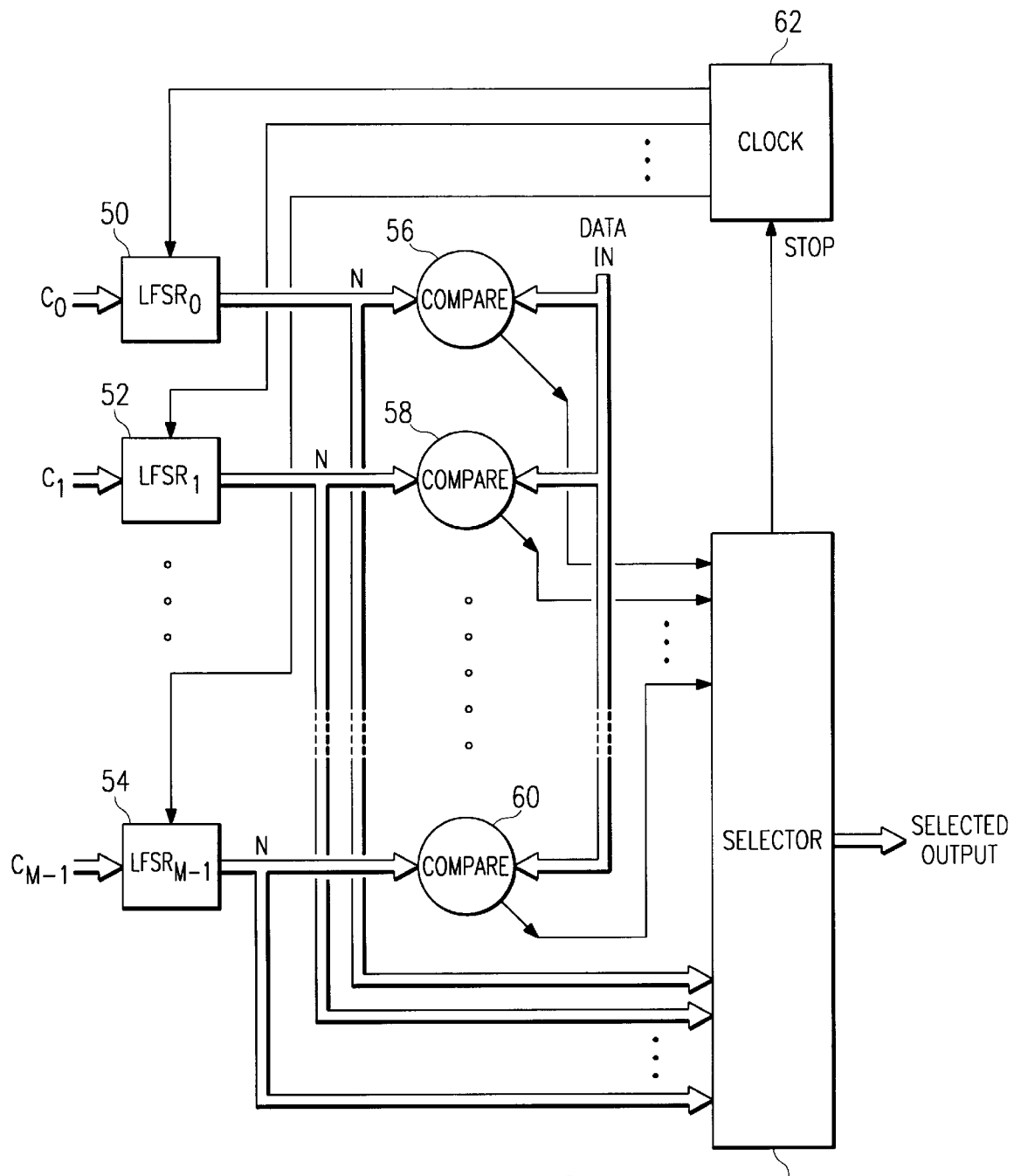
FIG. 3 is a block diagram of a N-bit transformation circuit constructed in accordance with the present invention.

Referring now to FIG. 3, an exemplary embodiment of the present invention includes a number M of N-bit linear feedback shift registers (LFSRs) such as a first LFSR (LFSR$_0$) 50 having an input C$_0$, a second LFSR (LFSR$_1$) 52 having an input C$_1$, and an Mth LFSR (LFSR$_{M-1}$) 54 having an input C$_{M-1}$. The LFSRs 50, 52 and 54 are selected such that each produces a subset of the total possible $2^N$ output bit patterns that does not overlap with any of the subsets produced by the other LFSRs. In other words, each LFSR 50, 52 and 54 produces a distinct group of N-bit outputs none of which is produced by any of the other LFSRs. Each subset of output patterns may be regarded as representing a short cycle of a defined length, while the combination of subsets may be considered to represent the maximum cycle length for an N-bit LFSR.

It will be appreciated that there is a great degree of flexibility in selecting the particular subset of output patterns produced by any of the LFSRs 50, 52 and 54 so long as all the possible output patterns are taken into account. For example, if M=6 and N=8, each of $LFSR_0$, $LFSR_1$, $LFSR_2$ and $LFSR_3$ may be selected so as to produce 60 different outputs upon successive applications of a clock pulse before returning to the initial output and repeating the cycle. Likewise, $LFSR_4$ and $LFSR_5$ may be selected so as to produce 12 and 4 different outputs, respectively. The sum of the cycle lengths for all the LFSRs in this example is 256, which is equal to the total number $2^8$ of possible output bit patterns that have to be produced.

Upon initializing the circuit of FIG. 3, each LFSR 50, 52 and 54 is loaded with a specific starting state $C_0$ to $C_{M-1}$ which is within the subset of output bit patterns that it can produce, but which otherwise can be arbitrary so long as it is known to both the transmitter and the receiver (e.g., the starting states $C_0$ to $C_{M-1}$ can be fixed constants in the corresponding subsets). The input bit pattern is then applied to each of M comparators 56, 58 and 60 respectively connected to the outputs of the LFSRs 50, 52 and 54. After the starting states $C_0$ to $C_{M-1}$ have been loaded into the LFSRs 50, 52 and 54, and the input applied to the comparators 56, 58 and 60, a clock pulse generator 62 generates consecutive clock pulses for shifting the contents of the LFSRs 50, 52 and 54. During each clock cycle, each of the comparators 56, 58 and 60 compares the input bit pattern with the output of the corresponding LFSR 50, 52 and 54, respectively, and generates a "match" signal to a selector 64 when the input and output patterns are the same. The selector 64, in turn, generates a "stop" signal to the clock pulse generator 62 after a predetermined number of clock pulses that depends on which of the comparators 56, 58 and 60 generated the match signal. In the preferred embodiment, this number of clock pulses is zero for all but one of the comparators 56, 58 and 60, and one for the remaining comparator which, for example, could be the last comparator 60. In this example, the selector 64 would immediately generate the stop signal upon receiving a match signal from any of the comparators 56 and 58, but would wait for one clock pulse before generating the stop signal when the match signal is received from the comparator 60.

Upon generating the stop signal, the selector 64 selects the output of a predetermined one of the LFSRs 50, 52 and 54 as the transformed output corresponding to the applied input. The next input value is then applied and the clock pulse generator 62 restarted. For each application of a new input value, the LFSR whose output is to be selected as the transformed output depends on which of the comparators 56, 58 and 60 generated the match signal, but must of course exclude the LFSR whose comparator generated the match signal (otherwise the selected output would simply be equal to the applied input). Since the output is selected from an LFSR other than the LFSR whose comparator generated the match signal, the mapping from input to output can be made non-linear. In one embodiment of the present invention, if the comparator corresponding to $LFSR_L$ generates the match signal, the output is selected from $LFSR_{L+1}$, the output being selected from $LFSR_0$ when L=M−1 (i.e., L is incremented to L+1 modulo M). This embodiment, however, may not be preferred if the cycle length of $LFSR_L$ is substantially greater than the cycle length of $LFSR_{L+1}$. For example, if the cycle length of $LFSR_L$ is 217 and the cycle length of $LFSR_{L+1}$ is 31, then $LFSR_L$ will cycle once while $LFSR_{L+1}$ will cycle seven times during the application of 217 consecutive clock pulses. Thus, there will be seven different values of $LFSR_L$, corresponding to seven different input values, which could result in the same output value being selected from $LFSR_{L+1}$. This would constitute a MANY:1 (i.e., 7:1) mapping and not the more desirable information lossless (i.e., 1:1) mapping.

The desired 1:1 mapping may be obtained, however, if the output is always selected from an LFSR with the same cycle length as the LFSR whose comparator generated the match signal. For example, if M=6 and the cycle lengths of the six LFSRs are 60, 60, 60, 60, 12 and 4, respectively, then a match signal from the comparator corresponding to $LFSR_0$ may cause the current output from $LFSR_1$ to be selected, a match signal from the comparator corresponding to $LFSR_1$ may cause the current output from $LFSR_2$ to be selected, a match signal from the comparator corresponding to $LFSR_2$ may cause the current output from $LFSR_3$ to be selected, and a match signal from the comparator corresponding to $LFSR_3$ may cause the output from $LFSR_0$ to be selected one extra clock pulse later (which would be equivalent to selecting the current output of $LFSR_0$ incremented by one). This extra clock pulse is used to ensure that repeated application of a given input value falling within the subset of values produced by any of $LFSR_0$ to $LFSR_3$ does not result in the same output value being repeatedly selected from the next LFRS in this loop, but would in fact cycle the resulting output value through all 60 values that are produced by the next LFSR in this loop. For each of the remaining shift registers $LFSR_4$ and $LFSR_5$, which have cycle lengths of 12 and 4, respectively, there is no other LFSR of equal cycle length with which it can be paired and, thus, each of these LFSRs may have to be paired with an LFSR having either a shorter or longer cycle length resulting in either MANY:1 or 1:MANY (information lossy) mapping. Alternatively, each of these LFSRs may be made to map onto itself shifted by one extra clock pulse thus resulting in a 1:1, though linear, mapping.

The most preferred mapping, of course, is a non-linear 1:1 mapping. In general, this requires that, for each LFSR of a certain cycle length, there is at least one other LFSR of the same cycle length, the output of which could be selected one (or possibly more) extra clock pulse(s) after a match signal being produced by the first LFSR. It can be seen, however, that in the case where some LFSRs have the same cycle length and others do not, all of the LFSRs with the same cycle length can be arranged in a circular group in which a match signal produced by the comparator corresponding to one LFSR causes the selection of the output of the next LFSR in the group, except that a match signal produced by the comparator corresponding to the last LFSR in the group causes the selection of the output from the first LFSR in the group after the generation of an extra clock pulse. The only other criteria which should be met is that the total of the cycle lengths of all of the LFSRs be equal to $2^N$, where N is the number of input bits.

In practice, there will be several different configurations of LFSRs which can meet the foregoing criteria for any given value of N. For example, if N=8 ($2^N$=256), it may be possible to use four LFSRs arranged in two circular groups, the first group consisting of two LFSRs each having a cycle length of 124, and the second group consisting of two LFSRs each having a cycle length of 4. Alternatively, it may be possible to use a circular group of three LFSRs each having a cycle length of 85, and a fourth LFSR having a cycle length of 1 (in which case one input value, corresponding to the fourth LFSR, may simply transform to itself). It may also be possible to use eight LFSRs arranged in two circular groups, the first group consisting of four LFSRs each having a cycle length of 56, and the second group consisting of four LFSRs each having a cycle length of 8. Of course, these examples do not exhaust the possible configurations which will be apparent to those skilled in the art in the case of N=8. Similarly, in the case of N>8, many more cycle length combinations meeting the foregoing criteria may be found to exist.

It will be appreciated by persons of ordinary skill in the art that the transform functions provided by the present invention, as shown generally in FIG. 3, may be implemented by using components other than LFSRs and associated comparators. For example, for an N-bit input value, a set of all of the possible N-bit values may be stored in a read-only-memory (ROM) in the form of a plurality of subsets each of which may be considered to contain the equivalent of the N-bit output values produced by a corresponding one of the LFSRs 50, 52 and 54 in FIG. 3. The input value is compared to the contents of the ROM in order to determine to which stored subset the input value belongs. The output value can then be selected from another subset in a manner equivalent to the operation of the circuit in FIG. 3 as described above. In an alternative implementation, a ROM constructed in accordance with the present invention stores for each possible N-bit input value a unique N-bit output value which is precomputed using the transform functions of FIG. 3. When a particular N-bit input value is applied, that value is used to form an address to the ROM so as to read (retrieve) the corresponding N-bit output value, which can then be used as the desired transformed value.

In general, those skilled in the art will readily recognize that many modifications and variations may be made to the embodiments of the present invention which are disclosed herein, without substantially departing from the spirit and scope of the present invention. Accordingly, the form of the invention disclosed herein is exemplary, and is not intended as a limitation on the scope of the invention as defined in the following claims.

What is claimed is:

1. A system for transforming an applied N-bit input value into a transformed N-bit output value comprising:

memory means for storing for each possible N-bit input value a corresponding N-bit output value which is predetermined by dividing a set of all possible N-bit input values into a plurality of mutually exclusive subsets each containing at least one possible N-bit input value, and by selecting the corresponding N-bit output value for any one possible N-bit input value from a subset other than the one to which said one possible N-bit input value belongs;

addressing means for forming from said applied N-bit input value an address to said memory means, said address being associated with a location in said memory means that stores the N-bit output value corresponding to said applied N-bit input value; and means for retrieving from said location the corresponding N-bit output value for use as the transformed N-bit output value.

2. The system of claim 1 wherein said memory means is a read-only-memory (ROM).

3. The system of claim 1 wherein said transformed N-bit output value is used in error correction coding or ciphering of said applied N-bit input value.

\* \* \* \* \*